United States Patent
Vidal et al.

(10) Patent No.: US 9,772,834 B2
(45) Date of Patent: Sep. 26, 2017

(54) EXPORTABLE ENCODED IDENTIFICATIONS OF NETWORKED MACHINES

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 635 days.

(21) Appl. No.: 12/768,416

(22) Filed: Apr. 27, 2010

(65) Prior Publication Data
US 2011/0265074 A1    Oct. 27, 2011

(51) Int. Cl.
*G06F 9/44*        (2006.01)
*G06F 9/445*       (2006.01)

(52) U.S. Cl.
CPC ..................... *G06F 8/65* (2013.01)

(58) Field of Classification Search
CPC ........................................ G06F 8/65
USPC .................................. 717/177, 171
See application file for complete search history.

(56) References Cited

U.S. PATENT DOCUMENTS

| | | | | |
|---|---|---|---|---|
| 5,940,513 A * | 8/1999 | Aucsmith | ............... | G06F 21/51 713/166 |
| 6,366,950 B1 * | 4/2002 | Scheussler | ............... | H04L 12/58 709/206 |
| 6,438,749 B1 | 8/2002 | Chamberlain | | |
| 6,578,113 B2 | 6/2003 | Krishnamurthy et al. | | |
| 6,754,895 B1 * | 6/2004 | Bartel | ....................... | G06F 8/65 717/171 |
| 6,789,255 B1 * | 9/2004 | Pedrizetti | ................... | G06F 8/65 717/169 |
| 6,957,185 B1 * | 10/2005 | Labaton | ................... | G06Q 20/10 380/279 |
| 7,113,594 B2 * | 9/2006 | Boneh | ................... | H04L 9/0847 380/277 |
| 7,194,730 B2 | 3/2007 | Pramberger | | |
| 7,240,336 B1 | 7/2007 | Baker | | |

(Continued)

OTHER PUBLICATIONS

Park et al. "Binding Identities and Attributes Using Digitally Signed Certificates", IEEE, 2000.*

(Continued)

*Primary Examiner* — Wei Zhen
*Assistant Examiner* — Junchun Wu
(74) *Attorney, Agent, or Firm* — Lowenstein Sandler LLP

(57) ABSTRACT

Embodiments relate to systems and methods for generating exportable encoded identifications of networked machines based on installed package profiles. A physical or virtual client machine can host a set of installed software packages, including operating system, application, and/or other software. A package manager tracks the set of installed packages and updates available for the installed set. The package manager can be configured to capture an inventory of the installed packages, and generate an encoded identification of the entire package complement and/or selected subsets of those packages. In aspects, the encoded identification can be based on a set of attributes of the installed packages and/or their constituent files, such as file names, version numbers, size, and/or other attributes. The encoded identification for the client machine can be transmitted to one or more remote management platforms, such as package servers, network management servers, or others for remote operations on the client machine.

15 Claims, 4 Drawing Sheets

(56) References Cited

U.S. PATENT DOCUMENTS

| | | | |
|---|---|---|---|
| 7,472,353 | B1 | 12/2008 | Wolff et al. |
| 7,512,939 | B2 | 3/2009 | Brookner |
| 7,530,065 | B1 | 5/2009 | Ciudad et al. |
| 7,624,393 | B2 | 11/2009 | Egan et al. |
| 7,634,454 | B2* | 12/2009 | Venolia ............ G06F 17/30716 717/143 |
| 7,657,885 | B2 | 2/2010 | Anderson |
| 7,693,962 | B2 | 4/2010 | Serlet et al. |
| 7,694,294 | B2 | 4/2010 | Bukovec et al. |
| 7,836,341 | B1 | 11/2010 | Krishnan |
| 7,984,420 | B2 | 7/2011 | Eldridge et al. |
| 7,987,449 | B1 | 7/2011 | Marolia et al. |
| 8,019,725 | B1 | 9/2011 | Mulligan et al. |
| 8,028,272 | B2 | 9/2011 | Eldridge et al. |
| 8,060,862 | B2 | 11/2011 | Eldridge et al. |
| 8,209,564 | B2 | 6/2012 | Vidal et al. |
| 8,225,271 | B2 | 7/2012 | Eldridge et al. |
| 8,250,654 | B1* | 8/2012 | Kennedy ................ H04L 41/22 726/22 |
| 8,255,902 | B1* | 8/2012 | Satish ........................ 717/174 |
| 8,407,669 | B2 | 3/2013 | Yee et al. |
| 8,429,256 | B2 | 4/2013 | Vidal et al. |
| 8,762,931 | B2 | 6/2014 | Vidal et al. |
| 2002/0087966 | A1 | 7/2002 | Wiginton, III et al. |
| 2002/0107856 | A1* | 8/2002 | Scheussler ............ H04L 12/58 |
| 2002/0156839 | A1 | 10/2002 | Peterson et al. |
| 2002/0170052 | A1 | 11/2002 | Radatti |
| 2003/0051235 | A1 | 3/2003 | Simpson |
| 2003/0065919 | A1* | 4/2003 | Albert .................... G06F 21/31 713/168 |
| 2003/0079041 | A1 | 4/2003 | Parrella, Sr. et al. |
| 2003/0229890 | A1 | 12/2003 | Lau et al. |
| 2004/0181790 | A1 | 9/2004 | Herrick |
| 2005/0076087 | A1 | 4/2005 | Budd et al. |
| 2005/0132357 | A1 | 6/2005 | Shell et al. |
| 2005/0182732 | A1* | 8/2005 | Miller .................... G06F 21/10 705/59 |
| 2005/0210459 | A1 | 9/2005 | Henderson et al. |
| 2006/0107062 | A1 | 5/2006 | Fauthoux |
| 2006/0190773 | A1* | 8/2006 | Rao .................... G06F 11/1433 714/38.14 |
| 2006/0230398 | A1 | 10/2006 | Yokota |
| 2007/0038991 | A1 | 2/2007 | Schuft et al. |
| 2007/0157192 | A1 | 7/2007 | Hoefler et al. |
| 2007/0169075 | A1 | 7/2007 | Lill et al. |
| 2008/0063191 | A1* | 3/2008 | Hatano ............... G06F 21/6209 380/45 |
| 2008/0134165 | A1 | 6/2008 | Anderson et al. |
| 2008/0141240 | A1 | 6/2008 | Uthe |
| 2008/0201705 | A1 | 8/2008 | Wookey |
| 2008/0215796 | A1 | 9/2008 | Lam et al. |
| 2008/0262878 | A1 | 10/2008 | Webby et al. |
| 2009/0013319 | A1 | 1/2009 | Williams et al. |
| 2009/0037897 | A1 | 2/2009 | Dull, III et al. |
| 2009/0144719 | A1 | 6/2009 | Pazdziora |
| 2009/0249215 | A1 | 10/2009 | Paek |
| 2009/0300149 | A1 | 12/2009 | Ferris et al. |
| 2009/0300595 | A1 | 12/2009 | Moran et al. |
| 2009/0300641 | A1 | 12/2009 | Friedman et al. |
| 2009/0307499 | A1* | 12/2009 | Senda ........................ 717/174 |
| 2010/0023933 | A1 | 1/2010 | Bryant et al. |
| 2010/0058308 | A1 | 3/2010 | Demshur et al. |
| 2010/0058314 | A1 | 3/2010 | Wang |
| 2010/0083243 | A1 | 4/2010 | Mincarelli et al. |
| 2010/0100636 | A1 | 4/2010 | Hegde et al. |
| 2010/0313196 | A1* | 12/2010 | De Atley ................ G06F 21/51 717/174 |
| 2011/0131564 | A1 | 6/2011 | Vidal et al. |
| 2011/0131565 | A1 | 6/2011 | Vidal et al. |
| 2011/0131566 | A1 | 6/2011 | Vidal et al. |
| 2011/0214114 | A1 | 9/2011 | Vidal et al. |
| 2011/0214118 | A1 | 9/2011 | Antill et al. |
| 2011/0265073 | A1 | 10/2011 | Vidal et al. |
| 2011/0265074 | A1 | 10/2011 | Vidal et al. |
| 2011/0265080 | A1 | 10/2011 | Matthew et al. |
| 2011/0289495 | A1 | 11/2011 | Mulligan et al. |
| 2011/0296390 | A1 | 12/2011 | Vidal et al. |
| 2011/0296393 | A1 | 12/2011 | Vidal et al. |
| 2011/0296394 | A1 | 12/2011 | Vidal et al. |
| 2011/0296395 | A1 | 12/2011 | Vidal et al. |
| 2011/0296397 | A1 | 12/2011 | Vidal et al. |
| 2012/0079471 | A1 | 3/2012 | Vidal et al. |

OTHER PUBLICATIONS

Tagliasacchi et al., "Hash-Based Identification of Sparse Image Tampering", IEEE, 2009, vol. 18, No. 11.*

Ateniese et al.,"Identity-Based Chameleon Hash and Applications", Springer-Verlag Berlin Heidelberg, 2004.*

Costigan, "Implementation of an Identity Based Encryption subsystem for secure e-Mail and other Applications", DCU, Jul. 2004.*

Seth Kelby Vidal, "Systems and Methods for Initiating Software Repairs in Conjuction With Software Package Updates", U.S. Appl. No. 12/714,200, filed Feb. 26, 2010.

Seth Kelby Vidal, "Systems and Methods for Diagnostic Notification via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidal, "Systems and Methods for Generating Predictive Diagnostics via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,657, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

EXPORTABLE ENCODED IDENTIFICATIONS OF NETWORKED MACHINES

FIELD

The present teachings relate to systems and methods for generating exportable encoded identifications of networked machines based on installed package profiles, and more particularly to platforms and techniques for generating an encoded identification of one or more physical or virtual machines in a managed network based on the identified complement of installed packages on individual machines, and the attributes of those packages.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging applications. In instances, a software package can contain application software, operating system software, drivers, patches, and/or other software components grouped as a logical set.

Software package update managers exist to help a user initiate and perform software package updates, such as, for example, the "yum" (Yellowdog update manager) package update manager available from Red Hat Inc., and others. In general, available software package managers are configured to interact with the set of installed packages on a client and with one or more software package repositories, to directly connect to those databases and download available package updates.

The task of managing a network of physical and/or virtual machines can be complicated by the need to identify and track the population of those machines under management. The machines under management may need to be identified and tracked for a variety of purposes, including, for instance, to identify and schedule package updates, activate and deactivate machines assigned to cloud or other networks, perform maintenance, and/or other package or network management tasks. In various networks, for example including those having multiple network administrators, the task of maintaining an inventory of machines, software packages on those machines, and/or other resources may be difficult to coordinate. It may be desirable to provide systems and methods for generating encoded identifications of networked machines based on installed package profiles, in which machines under management and their hosted packages and other resources can be discovered, identified, stored, updated and tracked using captured package profiles, facilitating maintenance, updating, and other operations on those deployments.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
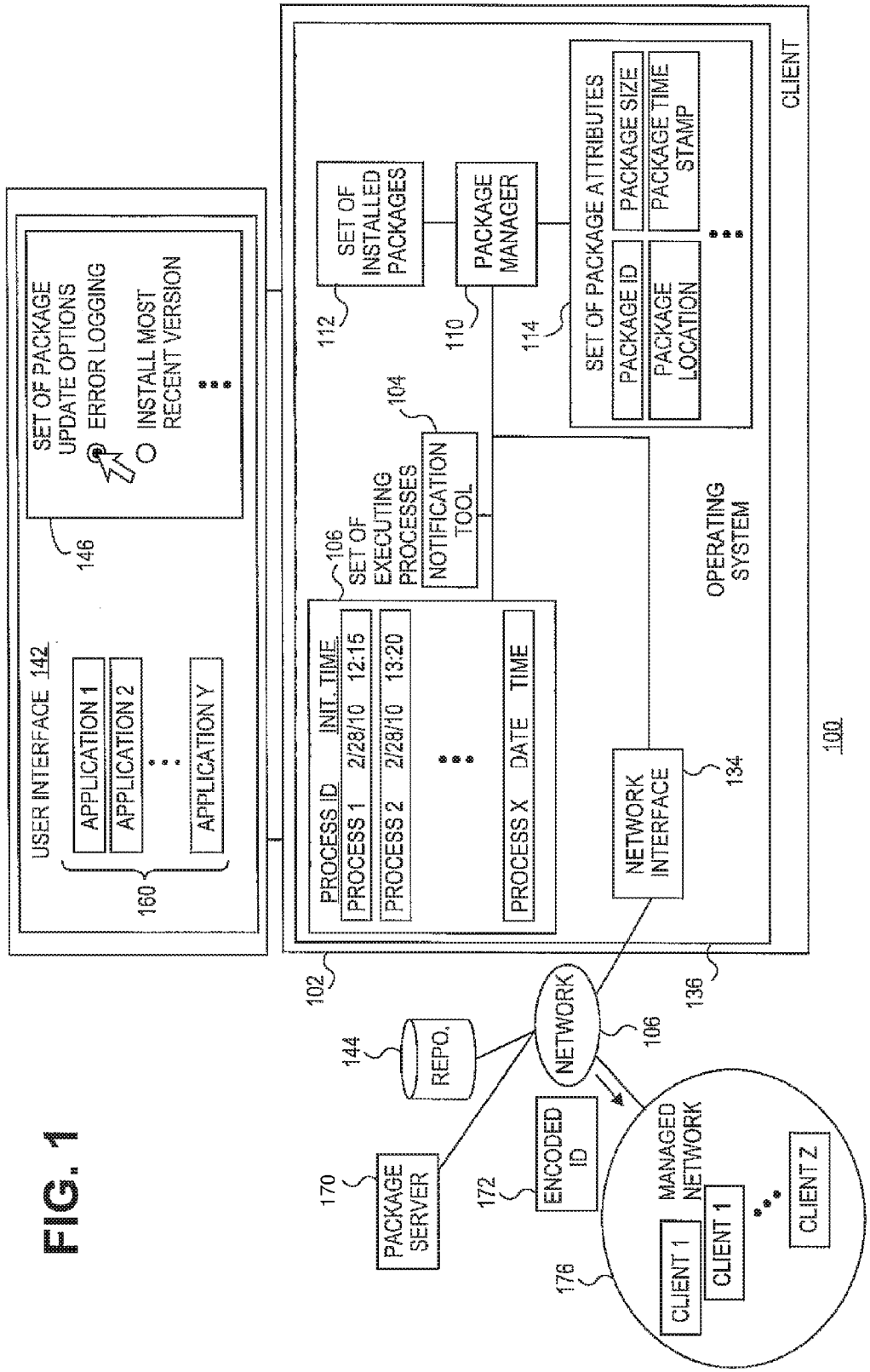
FIG. 1 illustrates an overall network in which systems and methods for generating exportable encoded identifications of networked machines based on installed package profiles can be implemented, according to various embodiments.

Embodiments of the present teachings relate to systems and methods for generating exportable encoded identifications of networked machines based on installed package profiles. More particularly, embodiments related to platforms and techniques for extracting a profile of installed packages and/or other resources hosted on a set of known or unknown machines, and developing and storing an encoded identification of those machines which can be used internally or exported externally for network and/or package management purposes. In aspects, a package manager can track and manage the installation of one or more software packages and/or updates to those packages (which may be referred to together as a "software package update") on a client, host, target, physical, virtual, and/or other machine. The package manager can be configured to access the set of installed packages and their related attributes on the client or other machine, and derive or generate an encoded identification based on that characterizing data. In aspects, the encoded identification can be or include the results of a hash function applied to package names, versions, timestamps or dates, size, number, and/or other attributes or metadata. In aspects, the encoded identification can be or include similar representations or encodings based on a selected subset of the packages installed on a client or other machine. In yet further aspects, the encoded identification can be or include the same types of representations or encodings based on the attributes of files contained within packages, or selected subsets of those files.

According to aspects in further regards, the package manager and/or other logic can transmit or share the encoded identification of one or more clients to one or more than one remote management platforms, to permit management operations on that set of machines. For instance, the encoded identification of one or more machines can be transmitted to or accessed by a remote package server, to permit software package updates to be performed on those machines. In aspects, the encoded identification can in addition or instead be transmitted to or accessed by a network management platform to identify the subject machine(s) for network maintenance, security, and/or other management operations. In aspects, newly connected machines in a managed network can be automatically discovered or identified, and be assigned an encoded representation which can be reported to a network management or other platform to be registered and tracked based on that identification or signature. These and other embodiments described herein address the various noted shortcomings in known package management and network management technology, and provide a user with enhanced package and system management capability including automatic and/or selective identification of deployed machines and their package assets.

Reference will now be made in detail to exemplary embodiments of the present teachings, which are illustrated in the accompanying drawings. Where possible the same reference numbers will be used throughout the drawings to refer to the same or like parts.

FIG. 1 illustrates an exemplary system 100 in which systems and methods for generating exportable encoded identifications of networked machines based on installed package profiles can be implemented, according to various embodiments. In embodiments as shown, a client 102 can store, execute, and otherwise host a variety of resources including a package manager 110 configured to communicate with a set of installed packages 112, and other hardware, software, and resources. In embodiments, package manager 110 can be or include a software application, a utility, an application programming interface (API) to an operating system 136 of client 102, a service, and/or other local or remote logic or resources. According to embodiments, package manager 110 can access and manage set of installed packages 112 to identify, run, edit, update, configure, and otherwise manage one or more software packages hosted or installed in client 102. In aspects, package manager 110 can be or include one or more commercially and/or publicly available package manager applications or resources, such as the "yum" package update manager available from Red Hat Inc. based on or compatible with the Red Hat package manager (rpm) platform, or others.

In aspects, set of installed software packages 112 can be or include packages comprising various types of applications, such as, for example, messaging applications, spreadsheet or modeling applications, social networking applications, word processing applications, and/or other applications, software, or utilities, and can in aspects include an operating system, drivers, and/or components thereof. Set of installed packages 112 can have an associated set of package attributes 114 which records file names, versions, dates, software requirements, an/or other attributes or metadata related to the software package updates installed on client 102.

In aspects, package manager 110 can communicate with a network interface 134 configured to connect to one or more network 106, such as the public Internet or other public or private networks. Package manager 110 can thereby connect to one or more package server 170 and/or associated package repository 144 hosting software packages including software package updates, and/or other software or resources. Package server 170 can include logic to identify, organize, and distribute one or more software packages to requesting client, server, virtual, and/or other machines.

In aspects, package manager 110 can interact with set of installed packages 112, package server 170, and/or one or more package repository 144 via network interface 134 and one or more networks 106 to identify and manage the content of set of installed packages 112 operating on client 102, and generate an encoded identification 172 of the client 102 and/or other resources associated with client 102. In aspects, package manager 110 can, for example, provide a user with a set of package update options 146 displayed via user interface 142, such as a graphical user interface or others, to select various test, configuration, and/or other management activities on set of installed packages 112. Set of package update options 146 can include options such as one or more selections to perform to select packages for installation and/or update, installation options, and/or other options or parameters for the downloading of package updates from one or more package repositories to set of installed packages 112.

In aspects, package manager 110 can access and extract information related to set of installed packages 112 to generate an encoded identification 172 of client 102 and/or other entities. In aspects, package manager 110 may generate encoded identification 172 based on set of installed packages 112 to create an identifier which can be used by local or remote platforms to perform package update, network management, and/or other operations on client 102. In aspects, the encoded identification 172 can represent a string, label, value, address, and/or other identifier which identifies or associates client 102 by or with its hosted set of installed packages 112. For instance, encoded identification 172 can represent the output of a hash function or hash operation performed on one or more attributes of a package contained in set of package attributes 114. For instance, package manager 110 can perform a hash function, such as Secure Hash Algorithm 1 (SHA1) or other hash function versions and/or other encoding algorithms, on attributes such as the package name, package epoch, package timestamp, package size, and/or other data. In aspects in certain regards, the encoded identification 172 can thereby represent a signature or characterizing code associated with a client 102 and its particular software package complement. In aspects, encoded identification 172 can represent a unique identifier for the particular client 102 whose set of installed packages 112 has been profiled in managed network 176. In aspects, encoded identification 172, including in cases where a hash function or operator is employed, can represent a non-unique identifier in managed network 176, for instance due to hash collision or can in aspects represent a unique representation of a client 102 and/or its set of installed packages 112, and/or one or more selected package subsets of set of installed packages 112.

Figure 2:
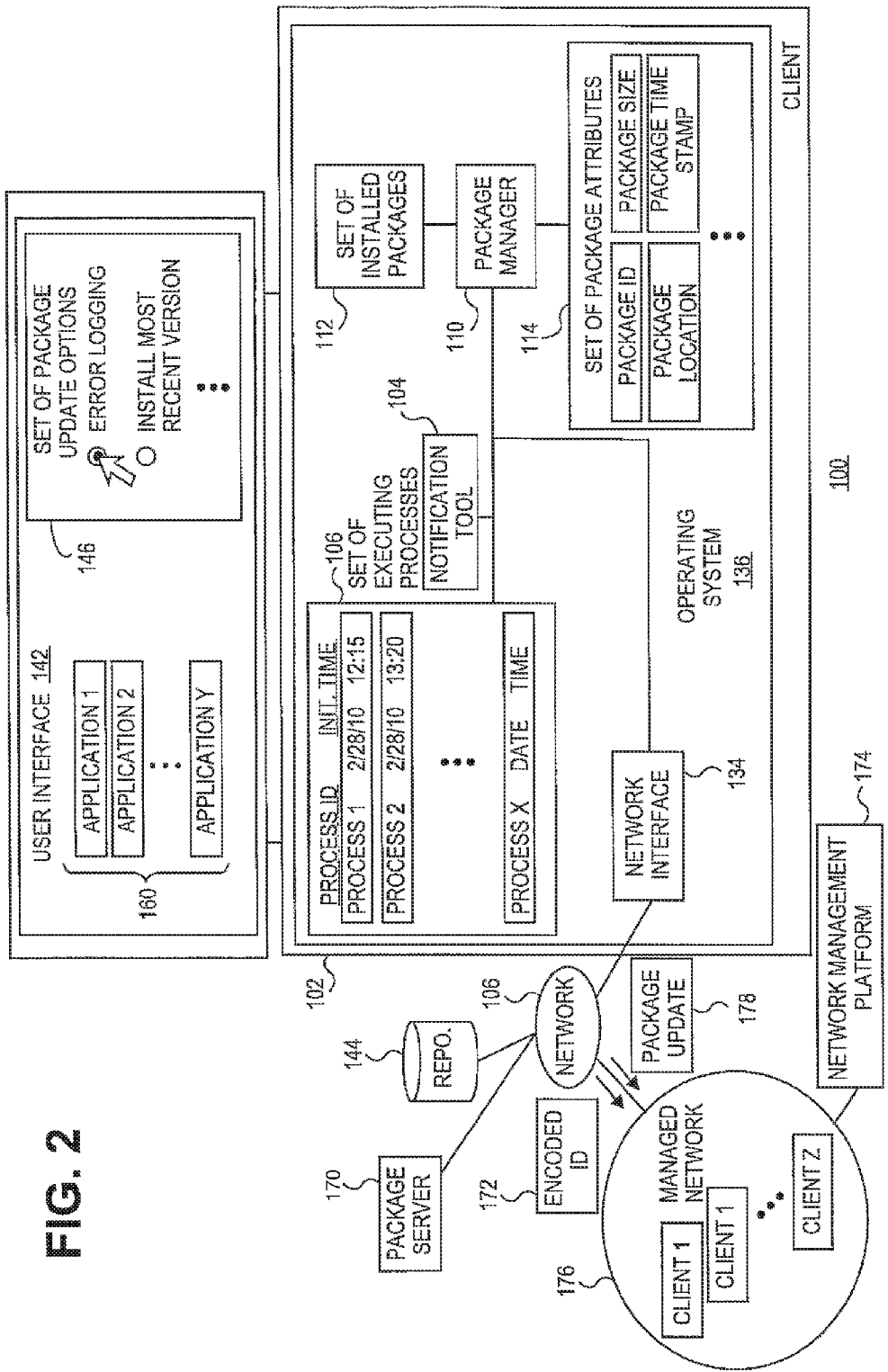
FIG. 2 illustrates an overall network in which for systems and methods for generating exportable encoded identifications of networked machines based on installed package profiles can be implemented, according to various embodiments in further regards.

As illustrated for example more particularly in FIG. 2, package manager 110 can connect to one or more remote platforms and communicate encoded identification 172 to those platform(s), to perform remote package, network management, and/or other operations or services on client 102. For instance, package manager 110 and/or other logic can access package server 170 and/or one or more repository 144 to initiate package update operations on client 102. For instance, encoded representation 172 can be decoded by package server 170 using package repository 144 via one or more network 106. Package manager 110 can receive one or more software package update 178 via package server 170 and/or one or more repository 144.

According to aspects, package manager 110 and/or other logic can interact with other types of remote platforms using encoded representation, such as, a network management platform 174 illustrated in FIG. 2. Network management platform 174 can be or include any type of known or available management server, service, and/or other platform, including, for instance, the Fedora unified network controller ("func") platform available from Red Hat, Inc., Raleigh, N.C., and described in co-pending U.S. patent application Ser. No. 12/130,424 filed May 30, 2008, entitled "Systems and Methods for Remote Management of Networked Systems Using Secure Modular Platform", assigned or under obligation of assignment to the same entity as this application, and which application is incorporated herein by reference. Other types or versions of network management platform 174 can be used. According to aspects, network management platform 174 can receive and store encoded identification 172 of one or more than one client 102 registered to or associated with managed network 176, and identify and communicate with corresponding client 102 using that identifier. In aspects, for instance, an operator of network management platform 174 can interrogate managed network 176 to discover or locate machines of interest, using encoded identification based on respective set of installed packages 112 and/or set of package attributes 114. For instance, an operator of network management platform 174, and/or package server 170 and/or other platform or logic, can interrogate managed network 176 to transmit a command to identify any client 102 eligible for or compatible with "revision 4" of "software package XYZ." Any client 102 matching the request can be identified using encoded identifier 172 and/or other data associated with corresponding clients or other machines. A query can likewise for instance be transmitted from network management platform 174 to managed network 176 to discover or locate any client 102 hosting "software package A," and/or possessing other attributes, resources, keys, or data, using encoded identifier 172. In aspects, network management platform 174 can group or associate one or more clients 102 having common package signatures in their respective encoded identifier 172, and/or based on other data or attributes.

In aspects, it may be noted that package manager 110 and/or other logic on a given client 102 can generate an updated encoded identifier 172, based on triggering events and/or other criteria. For instance, package manager 110 and/or other logic can generate an updated, revised, or new encoded identifier 172 when set of installed packages 112 in client 102 changes, such as when a package update and/or other software revision is received, and/or other resources associated with client 102 are changed. In aspects, package manager 110 and/or other logic can generate an updated encoded identifier 172 based on other criteria, such as at predetermined intervals or other schedules. Other criteria or conditions can be used to initiate an update to encoded identifier 172 of one or more client 102 in managed network 176. After generating any update to encoded identifier 172, package manager 110 and/or other logic can transmit encoded identifier 172 to one or more remote platform, such as, for instance, package server 170, one or more repository 144, network management platform 174, and/or other platforms, servers, machines, sites, and/or services.

Figure 3:
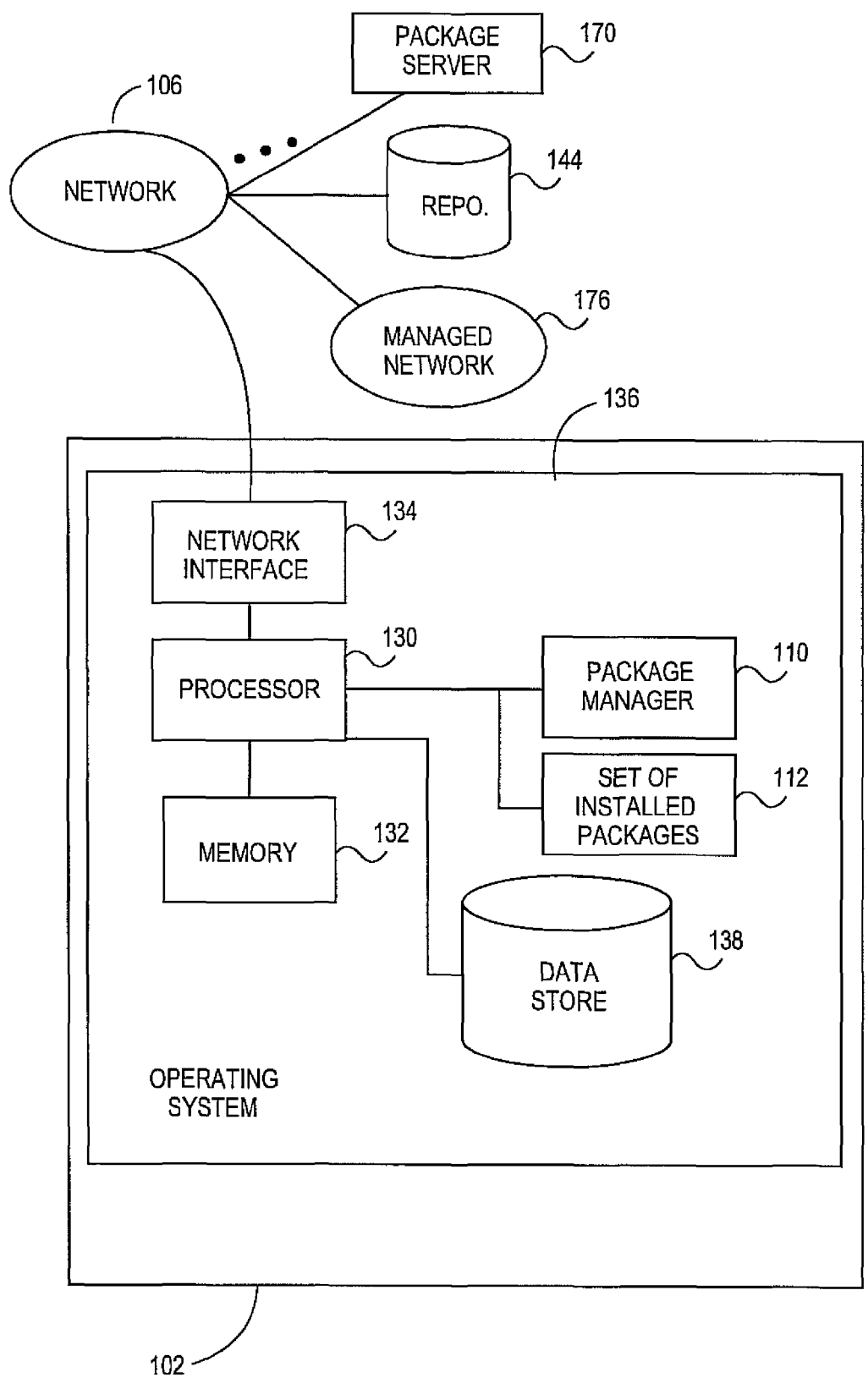
FIG. 3 illustrates exemplary hardware and other resources of a machine that can be used in conjunction with systems and methods for generating exportable encoded identifications of networked machines based on installed package profiles, according to various embodiments.

FIG. 3 illustrates an exemplary diagram of hardware and other resources that can be incorporated in a client 102 configured to install, host, manage, analyze, test and configure a set of installed packages 112 and other resources, according to embodiments. In embodiments as shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. One or more networks 106 can in turn connected to package server 170, one or more repository 144, managed network 176, and/or other networks, services, and/or resources. Processor 130 also communicates with package manager 110, and/or other resources to execute control logic and control the updating, installation, analysis and management of software packages and their associated processes. Other configurations of client 102, including processor and memory resources, associated network connections, and other hardware and software resources are possible.

Figure 4:
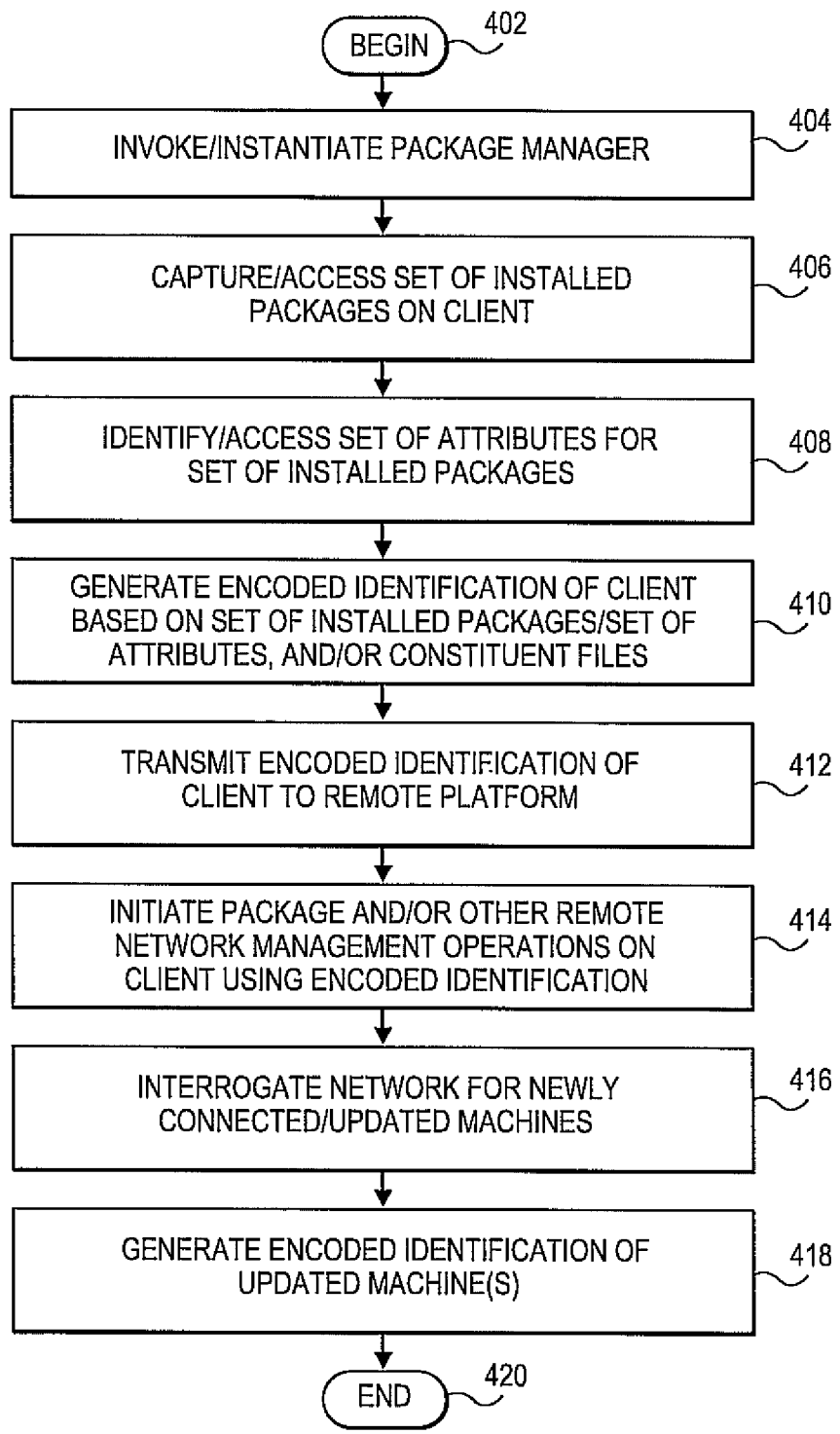
FIG. 4 illustrates a flowchart of processing that can be used in systems and methods for generating exportable encoded identifications of networked machines based on installed package profiles, according to various embodiments.

FIG. 4 illustrates overall processing to capture software package information from machines and generate exportable encoded identifications for those machines, according to various embodiments. In 402, processing can begin. In 404, a user can invoke or instantiate package manager 110 on client 102 to perform software package discovery, machine identification, and other management activity. In 406, package manager 110 and/or other logic can capture and/or access the set of package attributes 114 for set of installed packages 112 installed on client 102. In aspects, set of attributes 114 can be or include the name of an associated package, the version number or other version identifier for that package, a size of that package, an epoch of that package, a location of the package, as well as similar attributes of files contained in the packages, and/or other information. In 410, package manager 410 and/or other logic can generate an encoded identification 172 based on set of attributes 114 for one or more packages and/or constituent files of those packages. In aspects, encoded identification 172 can be generated using a hash function operating on text, strings, or other data reflecting one or more attributes in set of attributes 114. In cases where a hash function or hash operator is used, the hash function can be or include SHA1 (Secure Hash Algorithm 1), SHA2 (Secure Hash Algorithm 2), SHA3 (Secure Hash Algorithm 3), and/or other hash functions, operators or routines. In aspects, encoded identification 172 need not be based on a hash function, but can in addition or instead be based on other classes of functions or algorithms.

In 412, package manager 110 and/or other logic can transmit encoded identification 172 to a remote platform, such as a package server 170, a network management platform 174, and/or other remote server, platform, or service. In 414, package operations and/or other remote network management operations or functions can be initiated on client 102 using encoded identification 172. For instance, in aspects, package server 170 can identify client 102 using encoded identification 172 and generate a package update to update set of installed packages 112 on client 102. For further instance, in aspects, a network management platform 174 can establish a secure channel, or otherwise communicate, with client 102 to perform network management functions, such as, for example, performing configuration management on one or more client 102, executing security services related to one or more client 102, and/or other management operations. In 416, a managed network 176 containing one or more client 102 can be interrogated, for instance via network management platform 174, to discover any newly connected, activated, and/or updated machines. For instance, network management platform 174 can be configured to discover physical and/or virtual machines having a new network address, or other network registration. In 418, package manager 110 can generated an encoded identification 172 of any newly registered and/or updated machines, for instance by receiving a configuration command from network management platform 174 or otherwise. In 420, processing can return to a prior processing point, jump to a further processing point, or end.

The foregoing description is illustrative, and variations in configuration and implementation may occur to persons skilled in the art. For example, while embodiments have been described in which a unitary package manager 110 operating on client 102 is configured to control package management and client identification activity, in embodiments, multiple local and/or remote applications or software can interact to control the downloading, installation, testing, and other management of software packages, and the generation of encoded identification 172. For further example, while embodiments have been described in which one encoded identification 172 can be generated for one client 102, in embodiments, more than one encoded identification 172 can be generated for a given client 102, for instance, by appending additional data to encoded identification 172, and/or operating on data stored on or associated with client 102 in addition to set of installed packages 112 and associated set of package attributes 114. For yet further example, while embodiments have been described in which package update or client identification activity is conducted on one client 102, in embodiments, multiple local or remote targets, clients, and/or other machines can register to package manager 110 and/or other logic or resources to receive or perform package update and/or identification-encoding activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
    identifying, by a processor, a software package installed on a client machine managed by a remote management platform;
    generating, by the processor, an encoded identification of the client machine in response to identifying the software package residing on the client machine, wherein the encoded identification is a first hash value based at least in part of the software package in a first state;
    registering, by the processor with the remote management platform, the encoded identification of the client machine;
    generating, by the processor, an update to the encoded identification of the client machine to obtain an updated encoded identification in response to a detected change in the software package on the client machine, wherein the updated encoded identification is a second hash value based at least in part of the software package in a second state;
    receiving, by the processor, a request from the remote management platform to execute an operation on the client machine, the request comprising an identification;
    determining, by the processor, whether there is a match between the identification in the request and the updated encoded identification; and
    executing, by the processor, the operation on the client machine in response to the match.

2. The method of claim 1, wherein the generating the encoded identification of the client machine comprises generating the encoded identification in view of a set of attributes associated with the software package.

3. The method of claim 2, wherein the set of attributes comprises at least one of a package name identifier, a package version identifier, a package epoch identifier, a package timestamp identifier, a package size identifier, a file name identifier, a file version identifier, a file timestamp identifier, or a file size identifier.

4. The method of claim 3, wherein the generating the encoded identification comprises generating the first hash value using a hash function applied to the set of attributes.

5. The method of claim 4, wherein the generating the first hash value comprises generating the first hash value in view of a value of a text string associated with the set of attributes.

6. The method of claim 1, wherein the remote management platform comprises at least one of a package management platform or a network management platform.

7. The method of claim 6, wherein the remote management platform comprises a package management platform, and the client machine and the software package are identified to the package management platform via the encoded identification of the client machine.

8. The method of claim 7, further comprising generating a software package update for the client machine via the package management platform using the encoded identification of the client machine.

9. A system, comprising:
    a data store to store a software package to be installed on a client machine; and
    a processor, operatively coupled with the data store, to:
        identify the software package on the client machine managed by a remote management platform,
        generate an encoded identification of the client machine in response to identifying the software package, wherein the encoded identification is a first hash value based at least in part of the software package in a first state;
        register, with the remote management platform, the encoded identification of the client machine;
        generate an update to the encoded identification of the client machine to obtain an updated encoded identification in response to a detected change in the software package on the client machine, wherein the updated encoded identification is a second hash value based at least in part of the software package in a second state;
        receive a request from the remote management platform to execute an operation on the client machine, the request comprising an identification;
        determine whether there is a match between the identification in the request and the updated encoded identification; and
        execute the operation on the client machine in response to the match.

10. The system of claim 9, wherein the processor is further to generate the encoded identification in view of a set of attributes associated with the software package.

11. The system of claim 10, wherein the set of attributes comprises at least one of a package name identifier, a package version identifier, a package epoch identifier, a package timestamp identifier, a package size identifier, a file name identifier, a file version identifier, a file timestamp identifier, or a file size identifier.

12. The system of claim 10, wherein the processor is further to generate the first hash value using a hash function applied to the set of attributes.

13. The system of claim 12, wherein the processor is further to generate the first hash value in view of a value of a text string associated with the set of attributes.

14. The system of claim 9, wherein the remote management platform comprises a package management platform.

15. A non-transitory computer-readable storage medium comprising instructions that, when executed by a processor, cause the processor to:
    identify a software package installed on a client machine managed by a remote management platform;
    generate, by the processor, an encoded identification of the client machine in response to identifying the software package, wherein the encoded identification is a first hash value based at least in part of the software package in a first state;

register, with the remote management platform, the encoded identification of the client machine;

generate, by the processor, an update to the encoded identification of the client machine to obtain an updated encoded identification in response to a detected change in the software package on the client machine, wherein the updated encoded identification is a second hash value based at least in part of the software package in a second state;

receive, by the processor, a request from the remote management platform to execute an operation on the client machine, the request comprising an identification;

determine, by the processor, whether there is a match between the identification in the request and the updated encoded identification; and execute, by the processor, the operation on the client machine in response to the match.

* * * * *